Figure 1:
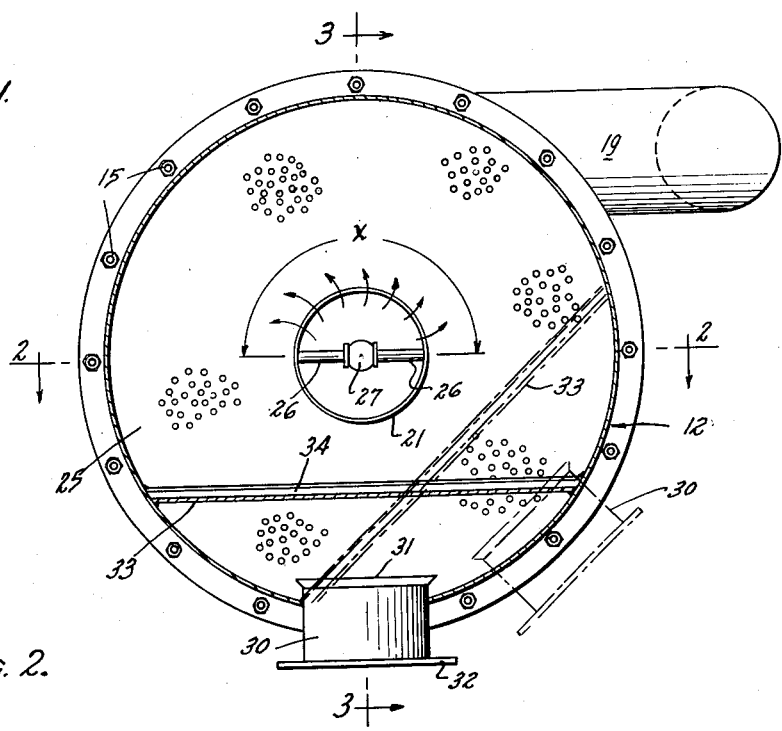

Sept. 25, 1956  J. P. TYSKEWICZ  2,764,535
STEAM AND WATER SEPARATOR FOR A SEA WATER EVAPORATOR
Filed Oct. 20, 1953  2 Sheets-Sheet 1

INVENTOR.
JOHN P. TYSKEWICZ
BY Roger C. McCormick
ATTORNEY

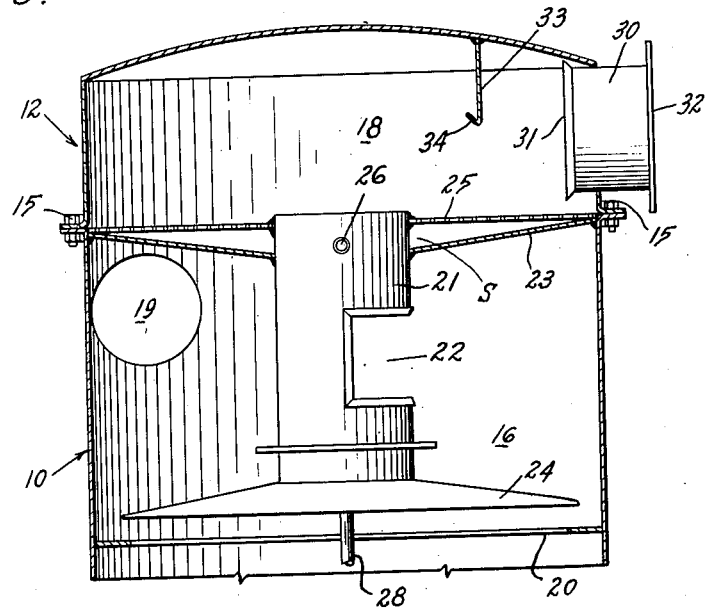

United States Patent Office 2,764,535
Patented Sept. 25, 1956

2,764,535

STEAM AND WATER SEPARATOR FOR A SEA WATER EVAPORATOR

John P. Tyskewicz, Hartford, Conn., assignor to The Maxim Silencer Company, Hartford, Conn., a corporation of Connecticut Application October 20, 1953, Serial No. 387,211

10 Claims. (Cl. 202—197)

This invention relates to improvements in a sea water evaporator and, more specifically, to an improved final stage steam and water separator therefor.

The invention will be readily understood by those skilled in the art without a detailed description of all of the elements of a sea water evaporator. Therefore, the accompanying drawings show only so much of the evaporator as is necessary to an understanding of the separator of the present invention. For more detailed disclosures and descriptions of sea water evaporators of the type to which the present invention may be applied, reference may be had to U. S. Patent No. 2,604,957, issued to Williamson and Tyskewicz on July 29, 1952, and to U. S. Patent No. 2,649,408, issued to Williamson and Tyskewicz on August 18, 1953.

As fully set forth in said patents, a sea water evaporator may comprise a generally cylindrical shell having a top-enclosing dome, the shell and dome being partitioned to define three chambers. In bottom-to-top order, said chambers are: (1) a boiler or heating chamber; (2) a first stage separating chamber; and (3) a second or final stage separating chamber. The first and second stage separating chambers and the elements associated therewith are generally referred to as the primary separator and the secondary separator, respectively.

In operation, sea water is heated in the boiler chamber to drive off wet steam which is circulated through the primary separator where much of the water is separated from the steam and then through the secondary separator where substantially all of the remaining water is separated from the steam. As shown in said patents, the aforesaid circulation may be accomplished by discharging the wet steam from the boiler chamber through the centrally disposed open end of a conduit which extends externally of the evaporator shell and which has an open outlet end extending tangentially into the upper portion of the primary separating chamber. The wet steam is whirled within the primary separating chamber at a relatively high speed and much of the water is separated in the form of droplets which are thrown against the wall of the shell by centrifugal force. The collected water drains down the shell wall into a sea water supply reservoir from which it is piped into the boiler chamber.

The remainder of the wet steam mixture, which has now become relatively dry steam, is collected within the primary separating chamber and discharged therefrom in a whirling motion through a side window opening in a centrally disposed conduit which extends vertically downwardly from the secondary separating chamber into the primary separating chamber. The relatively dry steam is discharged into the secondary separating chamber from the said centrally disposed conduit with a whirling motion and substantially all of the water remaining in the steam is separated by centrifugal force. The dry steam remaining from the original wet mixture is discharged from the separating chamber through an outlet conduit which extends into the secondary separating chamber in a substantially transverse plane.

Substantially all of the salt in the sea water is carried away in the water separated from the steam. The dry steam which is discharged from the secondary chamber is passed into a condenser and the condensate formed therein constitutes the fresh water supply for various shipboard uses and for fresh water uses in shore installations.

As previously mentioned, the wet steam and relatively dry steam are circulated through the primary and secondary separating chambers, respectively, at relatively great speed. This will become readily apparent when it is understood that a single unit evaporator may be required to furnish from 10,000 to 20,000 gallons of fresh water distillate per each day of operation.

It is well known that water which is collected on a surface tends to "creep" along the said surface to find an outlet. This tendency to creep is enhanced and becomes a serious problem in sea water evaporators by reason of the high velocities at which the steam passes through the separating chambers. The water which is separated from the steam mixture impinges upon the shell wall and to some extent upon the top wall of the enclosing dome. The water which is collected in the shell wall and top wall of the secondary separating chamber, or at least some of said water, has a tendency to creep along the walls defining the secondary separating chamber toward the outlet conduit which extends into said chamber as previously mentioned. If the water reaches the conduit, it then creeps toward the opening which receives the dry steam. Obviously, if the aforedescribed creep is not eliminated or materially reduced, salt-carrying water droplets may re-enter the steam at the outlet conduit and result in an unsatisfactory condensate.

It is an object of the present invention to provide a secondary separator construction which materially reduces and to a large extent eliminates "water creep" to the end that impurities are not re-introduced to the dry steam and thus to the condensate resulting therefrom.

A more specific object of the invention is to provide means in the secondary chamber of a sea water evaporator which will block off water creepage toward the dry steam outlet and which will collect water tending to creep toward said outlet so that the same may be discharged from the secondary separating chamber without re-entrainment in the dry steam.

Figure 2:
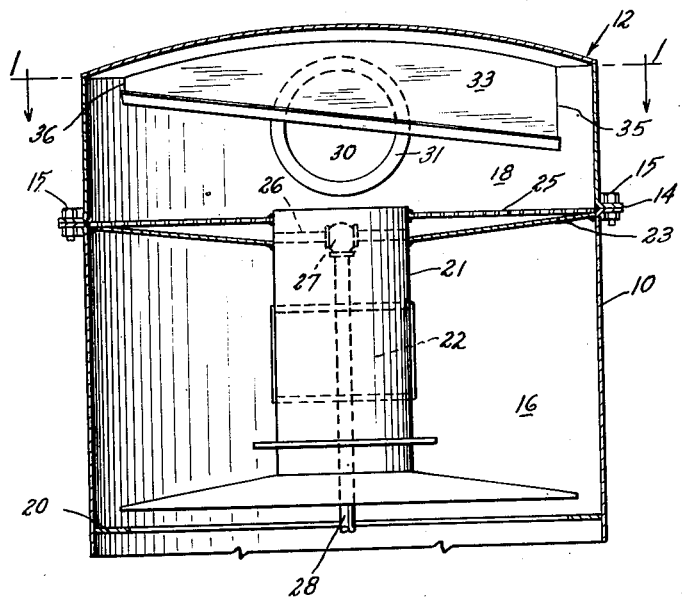

Other objects as well as advantages of the invention will become apparent to those skilled in the art from the following detailed description taken in connection with the accompanying drawings which, by way of preferred example only, illustrate one specific embodiment of the invention and in which, Fig. 1 is a horizontal cross-sectional view through the secondary separating chamber of a sea water evaporator, the section being taken substantially as indicated by the line 1—1 of Fig. 2;

Fig. 2 is a vertical cross-sectional view through the secondary separating chamber and major portion of the primary separating chamber, the said section being taken substantially as indicated by the line 2—2 of Fig. 1; and Fig. 3 is another vertical cross-sectional view taken in a plane normal to the section of Fig. 2 as indicated by the line 3—3 of Fig. 1.

As shown in the drawings, the sea water evaporator comprises a substantially cylindrical shell 10 which is preferably disposed in a vertical position and which is closed by a dome indicated generally by the reference numeral 12. The shell and dome 12 have cooperating radially extending flanges indicated at 14 and a plurality of bolts 15, 15 are employed to interconnect the flanges and thus detachably connect the dome 12 to the top of the shell 10.

As previously mentioned, the shell defines a boiler chamber (not shown) and a primary separating chamber 16 disposed above the boiler chamber. In the particular embodiment shown, the secondary or second stage separating chamber 18 is defined entirely within the dome 12.

With specific reference to the primary separating chamber 16, it will be noted that a conduit 19 extends tangentially into the upper portion of said primary separating chamber and, as previously mentioned, said conduit is utilized to pass wet steam from the boiler chamber into the primary separating chamber. The conduit 19 introduces the wet steam mixture tangentially of the chamber 16 so that the said mixture will be whirled therewithin in a counterclockwise direction as viewed from the top. Much of the water entrained in the wet steam mixture will be thrown by centrifugal force against the shell 10 and will then run down the shell wall and over an inwardly extending ring 20 secured transversely of the shell in the lower portion of the primary separating chamber. The water is then collected beneath the primary separating chamber for return to the boiler chamber with a fresh supply of sea water.

The relatively dry steam remaining from the mixture is discharged from the primary separating chamber 16 through a large diameter vertically disposed conduit or tube 21 which is provided with a window-like side opening 22 to receive the whirling stream of relatively dry steam. The said conduit 21 extends through and is supported by a generally conical partition 23 which is secured across the shell 10 adjacent the upper edge thereof and which defines the upper wall of the primary separating chamber. The concave surface of the partition 23 faces upwardly, the partition being provided in conical form for purposes which will be explained in detail hereinafter. The bottom end of the conduit 21 is closed and a generally conical skirt or apron 24 is secured to the bottom end of the conduit with its convex surface facing upwardly. The skirt 24 covers the opening in the ring 20 in spaced relationship to prevent splashing of sea water through the opening in the ring 20 and into the primary separating chamber. The skirt also provides an inclined drain surface which will cause any water collected on the conduit 21 to run downwardly and outwardly into the seat water supply.

The upper end portion of the conduit 21 extends through and is welded to the conical partition 23 and also projects slightly above a transversely disposed perforate plate 25 to which it is also welded. As best shown in Figs. 2 and 3, the conical partition 23 and perforate plate 25 extend to the wall of the shell 10 and are secured thereto adajcent its upper edge as by welding or the like. It is important to note that the upper end of the tube or conduit 21 projects slightly above the perforate plate and is open to introduce the steam to the second stage separating chamber. Accordingly, the conduit 21 may be referred to as a transfer conduit extending between the primary and secondary separating chambers. It is also important to note that the said conduit and the partition 23 and perforate plate 25 are wholly supported by the shell 10 thereby permitting removal and adjustment of the dome 12 with but little head space available.

With specific reference to the dome 12 and the second stage separating chamber 18 defined therein, it will be noted that the top wall of the dome is arcuate and that the convex surface thereof faces upwardly. The side wall of the dome is cylindrical and substantially equal in diameter to the cylindrical shell 10. When the dome is secured to the shell as shown in Figs. 2 and 3, the secondary separating chamber 18 is defined within the dome above the partition 23 and perforate plate 25.

The said second stage separating chamber 18 receives the relatively dry steam through the open end of the transfer tube 21. The steam will be introduced to the secondary separating chamber 18 with a whirling motion from said open end of the conduit 21 since the steam continues to follow the whirl path instituted in the primary separating chamber. In whirling within the secondary separating chamber (counterclockwise as viewed from the top thereof) substantially all of the remaining water in the dry steam is separated therefrom by centrifugal force. The water will, of course, impinge upon the cylindrical side wall of the dome and run down the said side wall through the perforate plate 25 onto the conical partition 23. It will be understood that an annular sump S is defined around the upper end of the conduit 21 above the conical partition 23 and beneath the perforate plate 25. The primary function of the perforate plate is to prevent water splashing from the sump into the chamber 18. The water may be conveniently drained from the said sump and returned to the sea water supply by means of a plurality of drain pipes 26, 26 which extend across the conduit 21 and through the sides thereof into the sump. The transverse pipes 26, 26 are interconnected as by a pipe coupling 27 to a vertically disposed drain pipe 28 which extends downwardly through the conduit 21 and through the bottom thereof into the sea water supply area.

At this point it should be explained that the whirling stream of relatively dry steam transferred to the secondary separating chamber is not discharged in uniform quantities in all radial directions from the open end of the transfer tube. The steam enters the transfer tube from one side through the window 22 which encompasses approximately 180° of arc in the tube. The steam follows a generally helical path up the transfer tube and, accordingly, it may be expected that the major portion of the radial discharge from the open end of the conduit will take place through an arc of approximately 180° as indicated for purposes of illustration by the angle $x$ in Fig. 1. The stream continues to follow a generally helical path within the dome 12 so that a major portion of the water separated from the steam in the dome impinges against the side wall and top wall thereof within an area which may be enclosed by an angle of approximately 180°. Of course, location of the discharge angle $x$ may vary from installation to installation, the location being dependent upon several variable factors. Some of the factors to be considered in determining the location of the discharge angle are: the location of the tangential inlet to the primary separating chamber, the radial location of the side window inlet to the transfer tube, the distance separating the side window inlet and the open end of the transfer tube and, to some extent at least, the velocity of the steam.

An important aspect of the present invention is encompassed in the construction of the dome-separator which is provided with means adapted to realize the greatest amount of water separation from a stream which is discharged as described. The said means is also adapted to prevent most of the water creepage which was previously described as having a deleterious effect upon secondary separator operation.

More specifically, the dome 12 is provided with an outlet conduit 30 which extends radially into the dome in a transverse plane. It is preferred that the said conduit be provided with a flared open end 31 projecting well into the dome and with a flanged outer end 32. The diverging flare is provided on the inner end of the dome to reduce the possibility of water creepage along the conduit 30 from the wall of the dome and into the open end of the conduit. The flange is provided on the outer end of the conduit to facilitate coupling the conduit to other conduit means (not shown) extending to the steam condenser.

An important feature of the dome construction resides in the provision of a plate 33 which is welded to the top and side wall of the dome to extend vertically downwardly therein in substantilly parallel relationship with the open end of the outlet conduit 30. As best shown in Fig. 1, the plate 33 is spaced between the open mouth of the conduit 30 and the center of the dome. Preferably, the plate is located approximately half way between the center of the dome and the side wall of the dome adjacent the outlet conduit, and as previously mentioned, in parallel relationship with the open end of the conduit. It is also preferred that the lower edge of the plate 33 be spaced from the bottom of the dome in a plane which is substantially on a diameter through the outlet conduit 30. Accordingly, in viewing the open inner end of said outlet conduit as in Fig. 2, approximately one-half of the open end will be covered by the plate.

It is important to note that the lower edge of the plate is turned upwardly at approximately 45° on the side of the plate disposed toward the center of the dome to provide a gutter 34 as best shown in Fig. 3 and it is also important to note that the upturned lower edge defining the gutter is inclined to permit water flow within the gutter. Accordingly, the plate 33 has a greater vertical dimension on one side 35 than on the other side 36 (Fig. 2). The greater side 35 is disposed to face the whirling stream within the dome. That is, the side 35 is located upstream with respect to the outlet conduit 30 while the side 36 is located downstream with respect thereto.

It will be understood that some water from the steam will impinge upon the plate 33 and drain into the gutter 34. The gutter will carry any water towards its lowest end to the side 35 and when the gutter becomes filled at the side 35, the water will overflow and course down the dome wall. It will also be understood that the plate 33 will block off or prevent water creepage toward the outlet along the arcuate wall of the dome and along a portion of the side wall of the dome because of the seal provided by welding the plate within the dome. The creeping water which flows to the plate 33 can only course down the plate into the gutter and be carried away to the side wall of the dome. It has also been observed that the provision of the plate reduces the tendency of water to creep along the top and side walls of the dome toward the outlet. That is, it has been noted that less than ordinary creepage occurs along the dome on the side of the plate opposite the outlet.

The aforedescribed dome may be used to particular advantage when positioned upon the shell 10 so that the plate 33 and open end of the outlet conduit 30 are disposed in normal relationship to a line bisecting the steam discharge angle $x$. It has been found that such location of the dome on the shell with respect to the discharge angle of the transfer tube results in the greatest amount of water and steam separation within the secondary separating chamber 18. However, it has been determined that the dome 12 can be rotated from the aforesaid position in the direction of movement of the whirling steam by approximately 50° to the position shown in dotted outline in Fig. 1 without any material loss in separating efficiency. The provision for dome adjustment without operating loss is a great advantage in the aforedescribed structure. More specifically, adjustment of the dome within the approximately 50° range described will facilitate connection of the outlet conduit 30 to a fixed conduit extending from a condenser. In addition, there is the advantage of being able to locate the dome in adjusted positions with respect to the shell, the adjustment being limited only by the location of the discharge angle $x$.

While only one embodiment of the invention has been shown and described, there are apparently many variations and modifications which may be brought about within the scope of the invention. Therefore, it is not the intent to limit the invention to the specific embodiment described, otherwise than indicated by the claims which follow.

I claim as my invention:

1. A steam and water separator comprising a generally cylindrical shell, top and bottom walls extending transversely of said shell in spaced apart relationship to define a generally cylindrical separating chamber therebetween, an inlet conduit opening into said chamber, an open end outlet conduit projecting radially into said chamber, and a plate depending from said top wall and extending across said shell in substantially parallel relationship with the open end of said outlet conduit, said plate being disposed in spaced relationship between said inlet conduit and said outlet conduit in a plane located approximately one-half the radial distance between the center of said chamber and said shell adjacent said outlet conduit, the bottom edge of said plate being disposed in spaced relationship to said bottom wall and being inclined across said shell substantially on a diametric line through said outlet conduit when viewed from a vertical plane through the center of said chamber, said bottom edge being also turned upwardly to define a gutter on the side of said plate dispoesd toward said inlet conduit.

2. A steam and water separator comprising a generally cylindrical shell, top and bottom walls extending transversely of said shell in spaced apart relationship to define a separating chamber therebetween, a plate depending from said top wall and extending across said shell with its bottom edge spaced from said bottom wall, said plate being disposed in radially spaced relationship to the center of said chamber and having its bottom edge turned upwardly to define a gutter on the side of said plate disposed toward the center of said chamber, an inlet conduit opening into said chamber on the side of said plate having said gutter to introduce a steam and water mixture therein for whirling movement within said chamber, and an open end outlet conduit projecting into said chamber in a transverse plane on the opposite side of said plate, said bottom edge of said plate being inclined across said shell with the greater side edge of said plate being disposed upstream with respect to said whirling mixture as viewed from said outlet conduit.

3. A steam and water separator comprising a generally cylindrical shell, top and bottom walls extending transversely of said shell in spaced apart relationship to define a generally cylindrical separating chamber therebetween, a plate depending from said top wall and extending across said shell with its bottom edge spaced from said bottom wall, said plate being disposed in radially spaced relationship to the center of said chamber and with its bottom edge turned upwardly to define a gutter on the side of said plate disposed toward the center of said chamber, an inlet conduit opening into said chamber on the side of said plate having said gutter to introduce a water and steam mixture for whirling movement therein, and an outlet conduit projecting into said chamber in a transverse plane on the opposite side of said plate and having an open end disposed in a plane parallel to said plate, the said upturned bottom edge of said plate being inclined across said shell with the greater side edge of said plate being disposed upstream with respect to the whirling mixture as viewed from said outlet conduit.

4. A steam and water separator comprising a generally cylindrical shell, top and bottom walls extending transversely of said shell in spaced apart relationship to define a generally cylindrical separating chamber therebetween, an inlet conduit opening into said chamber to introduce a water and steam mixture for whirling movement therein, an open end outlet conduit projecting radially into said chamber, and a plate depending from said top wall and extending across said shell in substantially parallel relationship with the open end of said outlet conduit, said plate being disposed in spaced relationship between said inlet conduit and said outlet conduit in a plane located approximately one-half the radial distance between the center of said chamber and the shell adjacent said outlet conduit, the bottom edge of said plate being spaced from said bottom wall and being turned upwardly to define a gutter on the side of the plate disposed toward said inlet conduit and said bottom edge also being inclined across the shell with the greater side edge of said plate being disposed upstream with respect to the whirling mixture as viewed from said outlet conduit.

5. A steam and water separator comprising a generally cylindrical shell, top and bottom walls extending transversely of said shell in spaced apart relationship to define a generally cylindrical separating chamber therebetween, an open end inlet conduit projecting through the center of said bottom wall to introduce a whirling mixture of water and steam to said chamber, an open end outlet conduit projecting radially into said chamber, and a plate depending from said top wall and extending across said shell in substantially parallel relationship with the open end of said outlet conduit, said plate being disposed in spaced relationship between said inlet conduit and said outlet conduit in a plane located approximately one-half the radial distance between the center of said chamber and the shell adjacent said outlet conduit, the bottom edge of said plate being spaced from said bottom wall and being turned upwardly to define a gutter on the side of said plate disposed toward said inlet conduit and said bottom edge also being inclined across the shell with the greater side edge of said plate being disposed upstream with respect to the whirling mixture as viewed from said outlet conduit.

6. A steam and water separator comprising a generally cylindrical shell, top and bottom walls extending transversely of said shell in spaced apart relationship to define a generally cylindrical separating chamber therebetween, an open end inlet conduit projecting through the center of said bottom wall and introducing a whirling mixture of water and steam to said chamber with the major portion of the mixture being introduced on one side of said open end of said inlet conduit, an open end outlet conduit projecting radially into said chamber toward the opposite side of the open end of said inlet outlet, and a plate depending from said top wall and extending across said shell in substantially parallel relationship with the open end of said outlet conduit, said plate being disposed in spaced relationship between said inlet conduit and said outlet conduit, the bottom edge of said plate being spaced from said bottom wall and being turned upwardly to define a gutter on the side of said plate disposed toward said inlet conduit and said bottom edge also being inclined across the shell with the greater side edge of said plate being disposed upstream with respect to the whirling mixture as viewed from said outlet conduit.

7. In a sea water evaporator of the class described which has a cylindrical shell, a transverse wall closing the top of the shell and a transfer conduit projecting through the central portion of the transverse wall and discharging a whirling mixture of water and steam from the shell, an improved water and steam separating dome for the shell comprising a top wall and a cylindrical side wall adapted to be detachably secured to the top of the shell in rotated positions thereon, an outlet conduit projecting into said dome in a transverse plane, and a plate depending from said top wall and extending across the cylindrical side wall of the dome with its bottom edge spaced from the said transverse wall, said plate being located between the center of the dome and said outlet conduit and having its bottom edge turned upwardly to define a gutter on the side of the plate disposed toward the center of the dome, said bottom edge being inclined across the dome with the greater side edge of said plate being disposed upstream with respect to the whirling mixture as viewed from said outlet conduit.

8. In a sea water evaporator of the class described which has a cylindrical shell, a transverse wall closing the top of the shell and a transfer conduit projecting through the central portion of the transverse wall and discharging a whirling mixture of water and steam from the shell, an improved water and steam separating dome for the shell comprising a top wall and a cylindrical side wall adapted to be detachably secured to the top of the shell in rotated positions thereon, an open end outlet conduit projecting radially into said dome, and a plate depending from said top wall in a plane substantially parallel to the open end of said outlet conduit and extending across the cylindrical side wall of the dome with its bottom edge spaced from the said transverse wall, said plate being located between the center of the dome and said outlet conduit and having its bottom edge turned upwardly to define a gutter on the side of the plate disposed toward the center of the dome, said bottom edge also being inclined across the dome with the greater side edge of said plate being disposed upstream with respect to the whirling mixture as viewed from said outlet conduit.

9. In a sea water evaporator of the class described which has a cylindrical shell, a transverse wall closing the top of the shell and a transfer conduit projecting through the central portion of the transverse wall and having an open end disposed in a transverse plane discharging a whirling mixture of water and steam from the shell, an improved water and steam separating dome for the shell comprising a top wall and a cylindrical side wall adapted to be detachably secured to the top of the shell in rotated positions thereon, an open end outlet conduit projecting radially into said dome in a transverse plane, and a plate depending from said top wall in substantially parallel relationship with the open end of said outlet conduit and extending across the cylindrical side wall of the dome in a plane located substantially half the radial distance from the center of the dome, said plate having a bottom edge which is spaced from the said transverse wall and which is turned upwardly to define a gutter on the side of the plate disposed toward the center of the dome, said bottom edge also being inclined across the dome with the greater side edge of said plate being disposed upstream with respect to the whirling mixture as viewed from said outlet conduit.

10. In a sea water evaporator of the class described which has a cylindrical shell, a transverse wall closing the top of the shell and a transfer conduit projecting through the central portion of the transverse wall and having an open end disposed in a transverse plane and discharging a whirling mixture of water and steam from the shell with the major portion of said mixture being discharged on one side of the open end of said transfer conduit, an improved water and steam separating dome for the shell comprising a top wall and a cylindrical side wall adapted to be detachably secured to the top of the shell in rotated positions thereon, an open end outlet conduit projecting radially into said dome in a transverse plane, and a plate depending from said top wall substantially parallel to the open end of said outlet conduit and extending across the cylindrical side wall of the dome, said plate being disposed between the center of the dome and said outlet conduit in a plane located substantially half the radial distance between the center of the dome and the side wall of the dome, said plate having its bottom edge spaced from the said transverse wall and turned upwardly to define a gutter on the side of the plate disposed toward the center of the dome, said bottom edge also being inclined across the dome with the greater side edge of said plate being disposed upstream with respect to the whirling mixture as viewed from said outlet conduit, and said dome being located on the shell with said outlet conduit extending toward the open end of said transfer conduit in diametrically opposed relationship to the side of said open end of the transfer conduit where the major portion of said mixture is discharged.

References Cited in the file of this patent

UNITED STATES PATENTS

| | | |
|---|---|---|
| 52,253 | Miller | Jan. 23, 1866 |
| 869,680 | Aitken et al. | Oct. 29, 1907 |
| 2,083,764 | Weisgerber | June 15, 1937 |
| 2,338,117 | Kermer | Jan. 4, 1944 |
| 2,604,957 | Williamson et al. | July 29, 1952 |
| 2,649,408 | Williamson et al. | Aug. 18, 1953 |